United States Patent
Park

(10) Patent No.: US 6,807,584 B2
(45) Date of Patent: Oct. 19, 2004

(54) APPARATUS AND METHOD FOR EXCHANGING STATUS INFORMATION BETWEEN BOARDS

(75) Inventor: Jae-Young Park, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 89 days.

(21) Appl. No.: 10/025,884

(22) Filed: Dec. 26, 2001

(65) Prior Publication Data

US 2002/0084819 A1 Jul. 4, 2002

(30) Foreign Application Priority Data

Dec. 26, 2000 (KR) .......................... 2000-81790

(51) Int. Cl.$^7$ ................................ G06F 3/00

(52) U.S. Cl. .............. 710/3; 710/12; 710/18; 710/105; 709/245; 713/400

(58) Field of Search ............ 710/3, 6, 12, 18, 710/36, 72, 105, 107; 712/225, 28, 220; 709/201, 245; 713/400, 600; 365/86

(56) References Cited

U.S. PATENT DOCUMENTS

| | | | | |
|---|---|---|---|---|
| 5,446,859 A | | 8/1995 | Shin et al. ................. 395/427 |
| 5,537,557 A | | 7/1996 | Briffett et al. ............. 395/309 |
| 5,844,856 A | * | 12/1998 | Taylor ................... 365/230.05 |
| 5,850,154 A | * | 12/1998 | Higuchi ...................... 326/86 |
| 6,242,950 B1 | * | 6/2001 | Bozso et al. ................. 326/86 |
| 6,335,720 B1 | * | 1/2002 | Mori et al. ................... 345/98 |
| 6,381,293 B1 | * | 4/2002 | Lee et al. ................... 375/377 |
| 6,515,515 B1 | * | 2/2003 | Bozso et al. ................. 326/86 |

* cited by examiner

Primary Examiner—Fritz Fleming
Assistant Examiner—RiJue Mai
(74) Attorney, Agent, or Firm—Fleshner & Kim, LLP

(57) ABSTRACT

An apparatus and method for exchanging information between printed circuit board assemblies of the present invention are disclosed. According to the invention, the number of address pins are assigned according to the amount of information to be exchanged between the boards. In a preferred embodiment, where data is transferred in 8 bit words, the amount of data that can be transferred using an address bits is given by $8 \times 2^n$. Thus, more status information can be exchanged with fewer edge pins. The duplication function between boards can so be more effectively implemented.

38 Claims, 5 Drawing Sheets

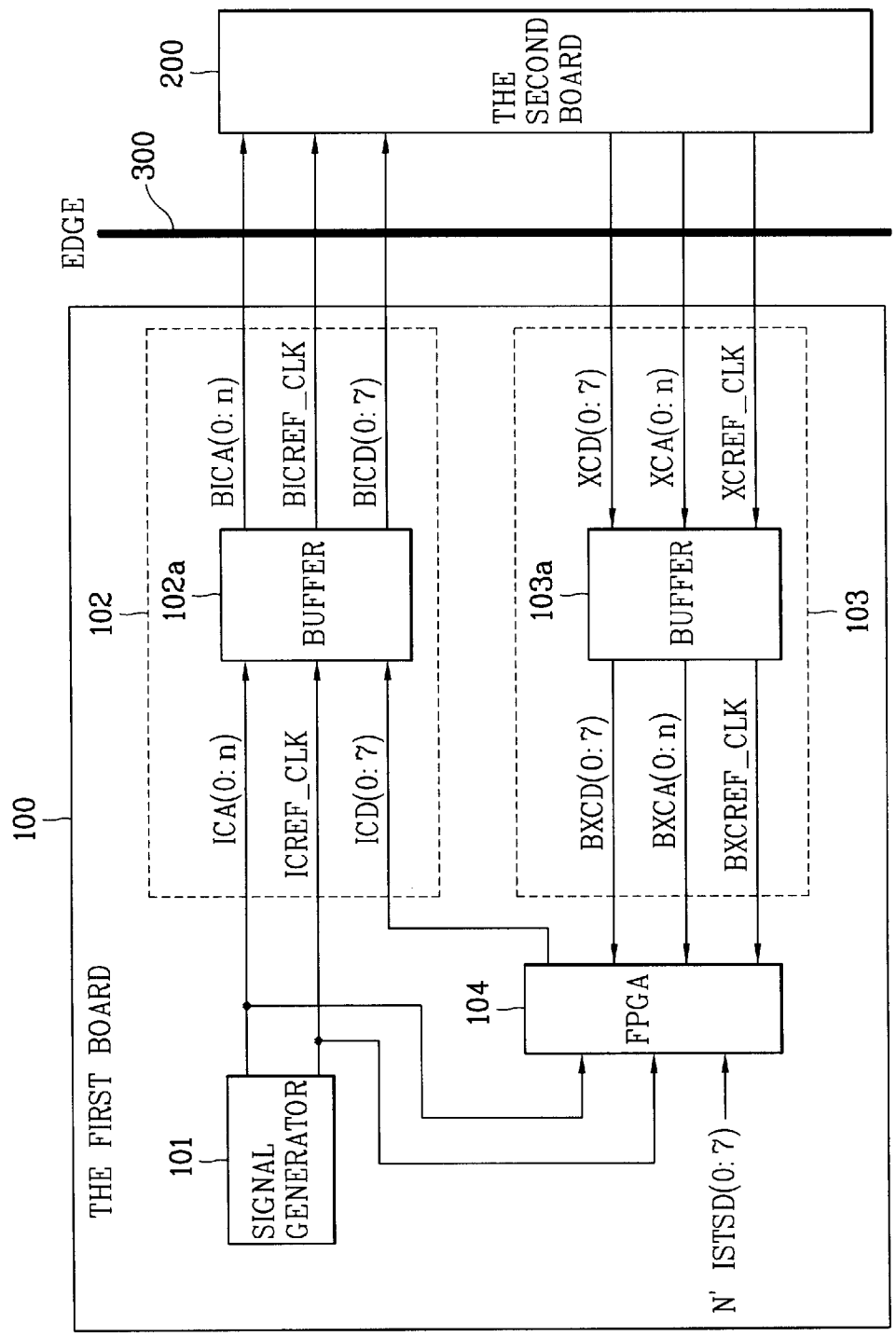

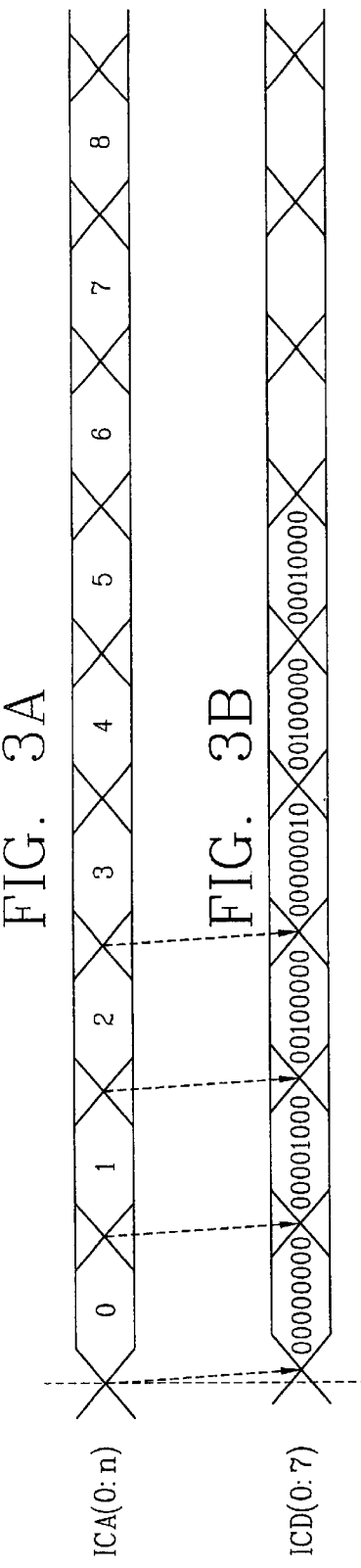
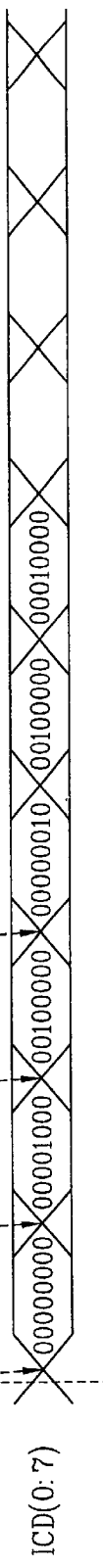
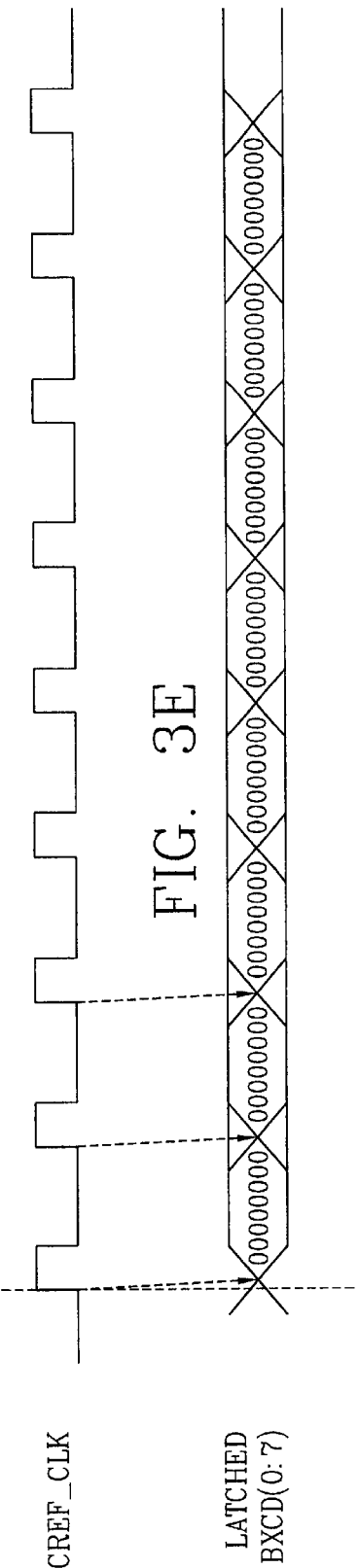
FIG. 3A  ICA(0:n)
FIG. 3B  ICD(0:7)
FIG. 3C  ICREF_CLK
FIG. 3D  BXCREF_CLK
FIG. 3E  LATCHED BXCD(0:7)

APPARATUS AND METHOD FOR EXCHANGING STATUS INFORMATION BETWEEN BOARDS

BACKGROUND OF THE INVENTION

1. Field of the Invention

The present invention relates to an apparatus and method for exchanging status information between circuits, and more particularly, to an apparatus and method for exchanging information between circuits with a limited number of connection points.

2. Background of the Related Art

In a personal mobile communication base station system and in other systems, circuit board assemblies (hereinafter "boards") are duplicated. In order to implement board duplication, a duplication exclusive signal is used and additional software processing may be required. Additional logic circuit and a edge connector pin are required to create the duplication exclusive signal.

FIG. 1 is a drawing illustrating an apparatus for exchanging status information between boards in accordance with the related art. As shown therein, an apparatus for exchanging status information between boards includes a connecting unit 30 for connecting a first board 10 to a second board 20 to transmit status information to the mutually exclusive board. The first board 10 includes a status information transmitting unit 11 to buffer status information (ICD[0:n]) of the first board 10 and transmit the buffered status information and, a receiving unit 12 to receive status information (XCD[0:n]) of the second board. The first board 10 also includes a field programmable gate array (FPGA) 13 to compare the status information ICD[0:n]) of the first board 10 and the status information (XCD[0:n]) of the second board and determine the status (active/standby) of the first and second boards.

The status information transmitting unit 11 and the status information receiving unit 12 include buffers 11a and 12a, respectively, to buffer a signal. The connecting unit 30 includes an edge pin formed at a corner of one side of each board for transmitting and receiving a data to and from a different board or other device.

The FPGA 13 generates the status information (ICD[0:n]) of the first board 10. The generated status information (ICD[0:n]) is outputted through the buffer 11a of the status information transmitting unit 11. The outputted status information is transmitted through the edge pin of the connecting unit 30 to the second board 20.

The status information (XCD[0:n]) of the second board 20 is transmitted through the connecting unit 30 to the buffer 12a of the first board 10, and is buffered by the buffer 12a. Then the buffered status information (BXCD[0:n]) of the second board 20 is received by the FPGA 13.

The FPGA 13 compares the received status for information (BXCD[0:n]) of the second board 20 and the generated status information (ICD[0:n]) of the first board 10, and determines an active state or a standby state of the first board and the second board 10 and 20 according to the result of the comparison.

Generally, in implementing such a board duplication function, if 'N' bit first board status information (ICD[0:n]) is transmitted through the buffer 11a to the second board, 20 'N' number of edge pins are used to output information. In addition, where 'N' bit second board status information (XCD[0:n]) is received by the first board 10, 'N' number of edge pins are used to input information. Consequently, 2N number of edge pins are required for exchanging 'N' bits of status information between the first board 10 and the second board 20.

The related art apparatus for exchanging status information between boards has many problems. For example, the number of pins used for exchanging status information between the first and the second board may be constrained by physical limitations. Thus, where the number of bits of status information to be exchanged is increased, the related art system fails to accommodate the increased information. Other problems also in the related art.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantage described hereinafter.

Another object of the present invention to provide an apparatus and method for exchanging more bits of status information between boards using a limited number of input/output pins.

Another object of the present invention is to provide an apparatus and method for exchanging status information between boards to effectively implement a board duplication function.

In order to achieve at least the above objects in whole or in part, and in accordance with the purpose of the invention, as embodied and broadly described, there is provided an apparatus for exchanging information between circuits, including first and second circuits, each having the same construction, each configured to transmit first and second information corresponding to the first and second circuits, respectively, to the other circuit corresponding to an address signal, and each other configured to latch the information received from the other circuit through a clock signal, and a connecting unit configured to couple the first and second circuits to enable a data transmission and reception between the first and second circuit.

To further achieve at least the above objects in whole or in part, and in accordance with the purpose of the invention, as embodied and broadly described, there is provided a method for exchanging information between circuits, including transmitting a first reformation to a second circuit and a second information to a first circuit, wherein the first and second information correspond to a first and second address signal, respectively, and latching the first information in the second circuit using a first clock signal and latching the second information in the first circuit using a second clock signal.

To further achieve at least the above objects in whole or in part, and in accordance with the purpose of the invention, as embodied and broadly described, there is provided a method for exchanging status information between circuits including transmitting first status information of a first circuit a second circuit, wherein the first status information corresponds to a first address signal receiving second status information corresponding to a second address signal from the second circuit in a first array, and comparing the first and second status information to determine at least one of a third status information of the first circuit and a fourth status information of the second circuit.

To further achieve at least the above objects in whole or in part, and in accordance with the purpose of the invention, as embodied and broadly described, there is provided a method for exchanging information between circuits, including periodically generating a first address signal of a first circuit, outputting first information corresponding to the first address signal, outputting a first clock signal timed so that the first information can be latched in a second circuit, buffering the first address signal, the first information and the first clock signal for transmission to the second circuit, transmitting second information, a second address and a second clock signal from the second circuit to an information receiving unit of the first circuit, and comparing the second information latched using the transmitted second clock signal with the first information to determine an active state or a standby state of each circuit.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 2 is a drawing illustrating an apparatus configured to exchange status information between boards, in accordance with a preferred embodiment of the present invention;

FIGS. 3A through 3E are drawings illustrating signal wave forms of the apparatus configured to exchange status information between boards, in accordance with a preferred embodiment of the present invention;

DETAILED DESCRIPTION OF PREFERRED EMBODIMENTS

Figure 1:
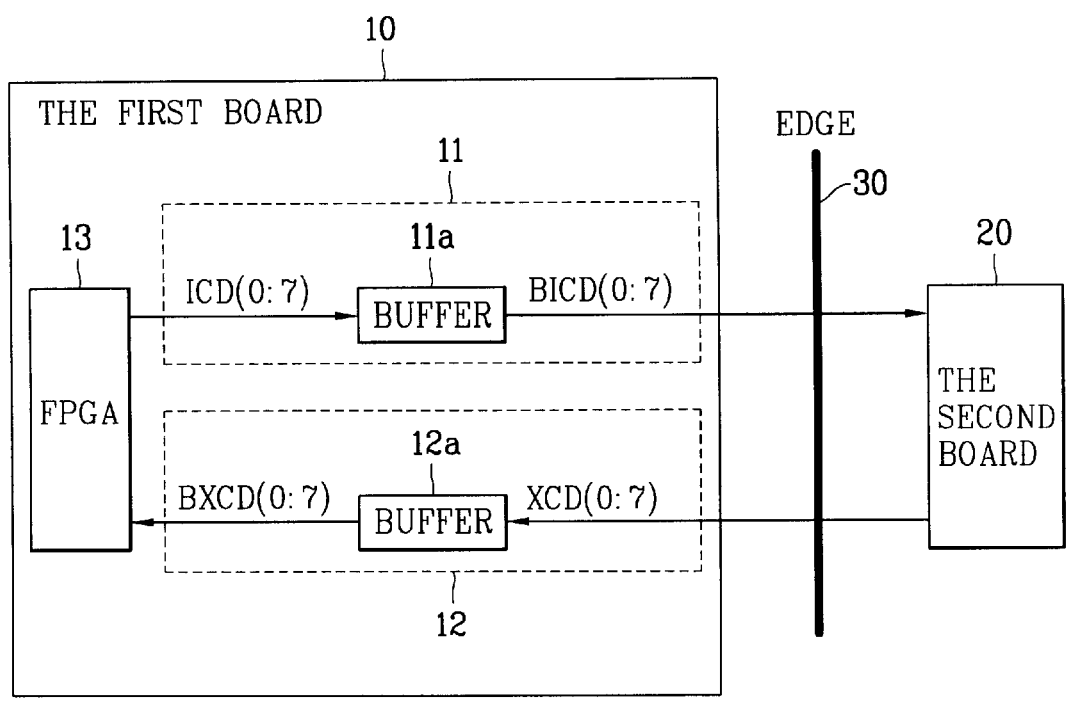
FIG. 1 is a drawing illustrating an apparatus configured to exchange status information between boards, in accordance with the related art.

FIG. 2 is a drawing illustrating an apparatus for exchanging status information between boards in accordance with a preferred embodiment of the present invention, and FIG. 3 is a drawing illustrating a signal wave form of the apparatus for exchanging status information between boards in accordance with a preferred embodiment of the present invention.

As shown in FIG. 2, an apparatus configured to exchange status information between boards in accordance with a preferred embodiment of the present invention includes a first board 100 and a second board 200. Boards 100 and 200 preferably have the same construction, and mutually perform a data transmission and reception through a connecting unit 300, for example an edge card connector.

The first board 100 preferably includes a signal generator 101 that assigns an address pin according to status information of the first board 100 and generates a first address signal (ICA[0:n]) and a first clock signal (ICREF_CLK). First board 100 also preferably includes a status information transmitting unit 102 to transmit a signal from the first board 100 to the second board 200 and a status information receiving unit 103 to receive a signal transmitted from the second board 200. The first board 100 also preferably includes and a field programmable gate array (FPGA) 104 to compare the status information (ICD[0:7]) of the first board 100 and the status information (XCD[0:7]) of the second board 200.

As the amount of status information exchanged between the first board 100 and the second board 200 is increased, the number of allocated address pins is increased accordingly. Where the number of allocated address pins is 'n', a value of the transmittable status information amount is '$2^n$'.

Equation (1) indicates a transmittable data information amount when status information of the board is implemented by 8 bit and there are n number of address pins, and equation (2) indicates the total number of edge pins used for transmission of 8 bit data.

$$\text{Maximum data information amount} = 8 \times 2^n \qquad (1)$$

$$\text{Total number of used edge pins} = n+8-1 \qquad (2)$$

For example, if status information (ICD[0:7]) of the first board 100 (implemented by 8 bits) totals is 32 bits, then $32=8\times2^n$, and n=2. Thus, the signal generator 101 assigns 2 address pins and generates first address signals (ICA[0:n]) of 00, 01, 10, 11. In addition, the signal generator 101 assigns one clock signal pin so generate a first clock signal (ICREF_CLK) latched to the first address signal.

The FPGA 104 preferably outputs the status information (ICD[0:7]) of the first board 100 corresponding to the first address signal (ICA[0:n]) in the unit of 8 bits. The outputted status information of the first board 100, the first address signal (ICA[0:n]), and the first clock signal (ICREF_CLK) are buffered through the buffer 102a and are externally transmitted through the edge connection unit 300.

When the status information (ICD[0:7]) of the first board 100 is 33~64 bits, the signal generator 101 preferably assigns 3 address and generates address signals (ICA[0:7]) of 000, 001, 010, 011, 100, 101, 110, 111. If the status information (ICD[0:7]) of the first board 100 is 65~128 bits, then the signal generator 101 preferably assigns 4 address pins according to the above described principle. Accordingly, if 'n' bit address pins are assigned to the status information implemented by 8 bits, a maximum amount of transmittable status information is $8\times2^n$ bits, and everytime the allocation number (n) of the address pins is increased by 1 bit, the transmittable status information amount is increased by $8\times2^n$.

If the transmitted status information is 64 bits, a total of 12 edge pins are allocated with 3 for address pins, 8 for the status information and one for the clock signal. This is far more effective than the apparatus and method of the related art, which would allocate 64 edge pins to transmit 64 bit data.

FIGS. 3A through 3E are drawings illustrating signal wave forms of the apparatus configured to exchange status information between boards, in accordance with the preferred embodiment of the present invention.

As shown in FIGS. 2 and 3A, the signal generator 101 periodically generates an address signal (ICA[0:n]) at certain intervals and transmits the address signal (ICA[0:n]) to the FPGA 104 and the status information transmitting unit 102. The signal generator 101 also preferably generates a clock signal (ICREF_CLK) corresponding to the status information (ICD[0:7]).

The clock signal (ICREF_CLK) is preferably timed as shown in FIG. 3C and outputted from the signal generator 101 so that the opposite board can latch the status information of each board. The clock signal (ICREF_CLK) is preferably synchronized with a central portion of the status information in order to accurately latch the status information.

The status information transmitting unit 102 and the status information receiving unit 103 preferably include buffers 102a and 103a, respectively, to buffer various signals externally transmitted from the first board 100 signals received by the first board 100 from the second board 200.

The buffers 102a and 103a are installed in the status information transmitting unit 102 and the status information receiving unit 103, respectively. The status information transmitting unit 102 and the status information receiving unit 103 transmit the status information, the address signal and the clock signal of each board together.

Figure 4:
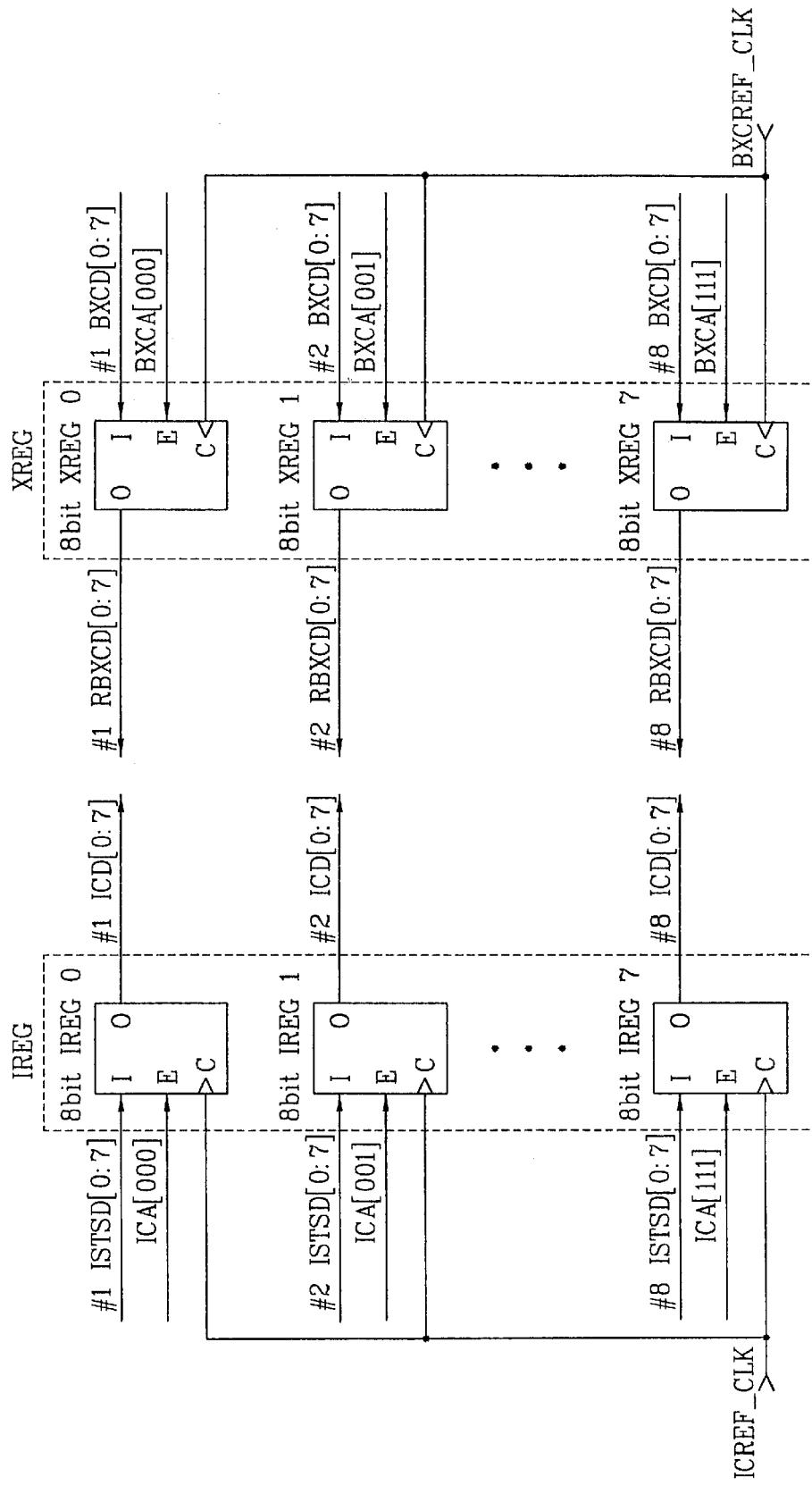
FIG. 4 is a drawing illustrating the detailed construction of a field programmable gate array (FPGA), in accordance with a preferred embodiment of the present invention.

FIG. 4 is a drawing illustrating the detailed construction of a field programmable gate array (FPGA) in accordance with a preferred embodiment of the present invention.

As shown in FIG. 4, the FPGA preferably includes multiple registers to store and output the status information according to an address signal and a clock signal inputted from an external source. The status information of the first board 100 is inputted to a register (IREG), status information of the second board 200 is inputted to a register (XREG), and each register is enabled by the corresponding address signal.

The FPGA 104 preferably receives status information (N*ISTSD[0:7]) corresponding to the address signal (ICA[0:n]) outputted from the signal generator 101. The FPGA 104 preferably compares the status information (BXCD[0:7]) of the second board 200 and the status information (ICD[0:7]) of the first board 100 to determine the status of each board. The FPGA 104 preferably outputs the status information of the first board (ICD[0:7]) in 8 bit words corresponding to each address signal (ICA[0:n]) as shown in FIGS. 3A, 3B and 4.

In addition, as shown in FIGS. 3D and 4, the FPGA 104 preferably processes the status information of the second board by latching the status information (BXCD[0:7]) of the second board 200 while the second clock signal (BXCREF_CLK) is at a high level.

The operation of the FPGA 104 will now be described. The status information (N*ISTSD[0:7]) from the first board 100 inputted to the first through eighth register on register IREG (IREG0~IREG 7). At a rising edge of first clock signal (ICREF_CLK) the status information (ISTD[0:7]) is stored in each register (IREG 0~IREG 7) by 8 bits according to the first address signal (ICA[0:n]).

Since 8 bit status information is inputted to the eight registers (IREG 0~IREG 7), a total of 64 bits of status information is inputted into the FPGA 104. The first address signal (ICA[0:2]) is preferably a 3 bit address to enable the 8 bit register (IREG).

The status information (N*ISTSD[0:7]) stored in each of the registers (IREG0~IREG7) is outputted (ICD[0:7]) when the value of the first address signal (ICA[0:2]) is repeated.

The status information (N*BXCD[0:7]) of the second board 200 is inputted to the first register through the eighth register of register XREG (XREF 0~XREG 7). At a rising edge of second clock signal (XCREF_CLK), the status information is stored by 8 bits in each register (XREG 0~XREG 7) according to the second address signal (BXCA[0:2]). The second address signal (BXCA[0:2]) is preferably a 3 bit address to enable the 8 bit register (XREG).

The status information (N*BXCD[0:7]) stored in each of the registers (XREG 0~XREG 7) is outputted (RBXCD[0:7]) when the value of the second address signal (BXCA[0:2]) is repeated.

Then, the FPGA 104 compares the status information (ICD[0:7]) of the first board 100 to the status information (RXCD[0:7]) of the second board 200. According to the comparison, the FPGA 104 determines an active state or a standby state of the first board and the second board to recognize the state of each board and control the duplication.

One corner of each board 100 and 200 preferably includes an edge pin enabling a data transmission and reception between different board or other device.

Figure 5:
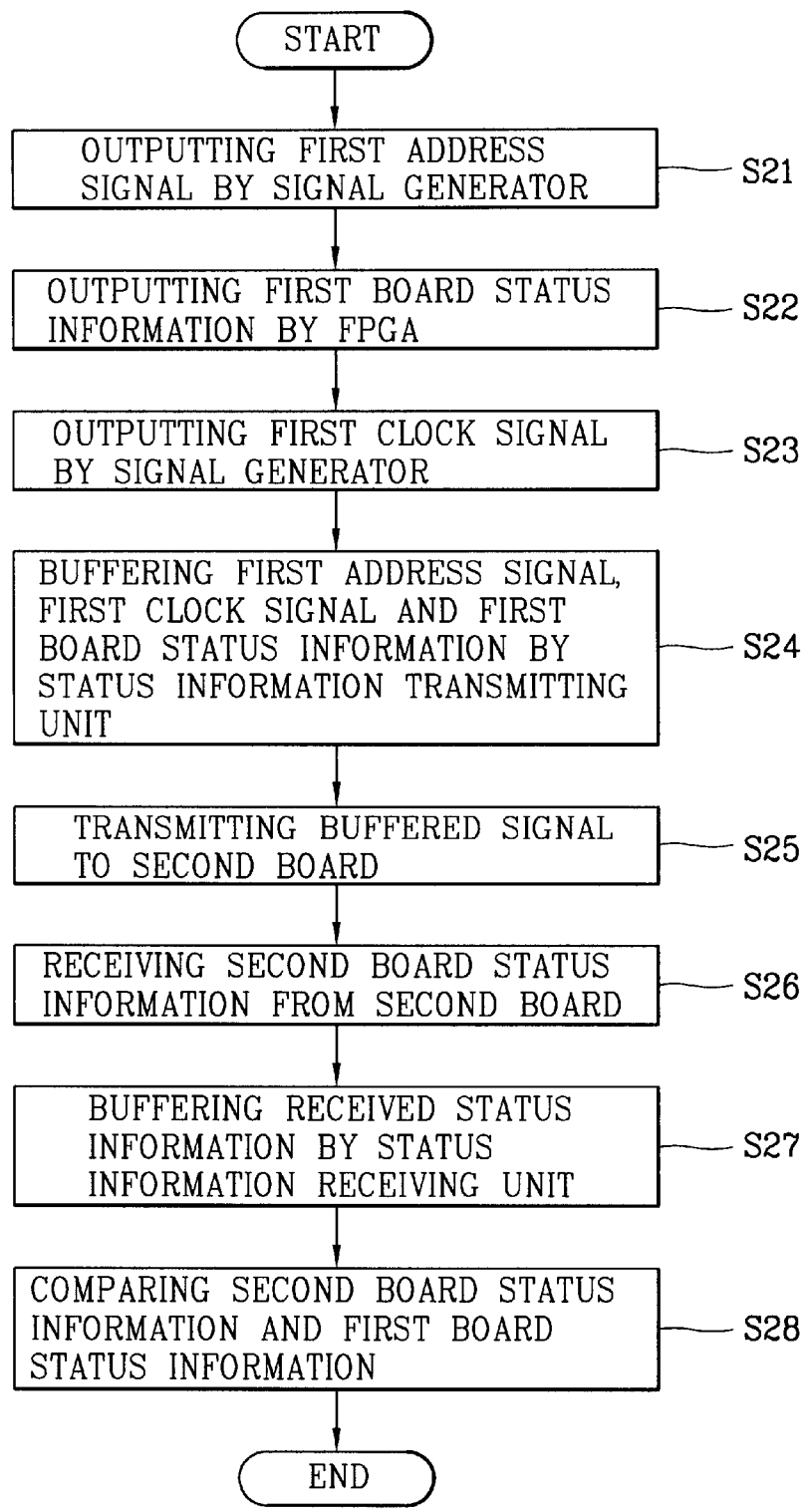
FIG. 5 is a flow chart of a method for exchanging status information between boards, in accordance with a preferred embodiment of the present invention.

FIG. 5 is a flow chart of a method for changing status information between boards in accordance with a preferred embodiment of the present invention. The following description of a method performed by the first board 100 is also representative of a method performed by the second board 200.

The first address signal (ICA[0:n]) is preferably outputted at regular intervals from the signal generator 101 to the FPGA 104 and the status information transmitting unit 102 (step S21).

The FPGA 104 allocates address pins according to the amount status information of the first board 100 and outputs the status information (ICD[0:7]) corresponding to the first address signal (ICA[0:n]) transmitted from the signal generator 101 (step S22). The status information of the first board 100 is preferably contained in 8 bits.

The signal generator 101 additionally allocates a pin to generate a first clock signal (ICREF_CLK) latched to the first address signal (ICA[0:n]) (step S23).

The first address signal (ICA[0:n]), the first clock signal (ICREF_CLK) and the status information (ICD[0:7]) of the first board 100 are preferably buffered through the buffer 102a (step S24).

The buffered first address signal (BICA[0:n]) the buffered first clock signal (BICREF_CLK), and the buffered status information (BICD[0:7]) of the first board 100 are transmitted through the edge connecting unit 300 to the second board 200 (step S25).

The status information (XCD[0:7]) of the second board 200, the second address signal (XCA[0:n]) and the second clock signal (XCREF_CLK) are received through the edge connecting unit 300 into the buffer 103a of the status information receiving unit 103 (step S26).

The received signals are preferable buffered, and the buffered status information (BXCD[0:7]), the buffered address signal (BXCA[0:n]) and the buffered clock signal (BXCREF_CLK) are inputted to the FPGA 104 (step S27).

The FPGA 104 compares the buffer status information (BXCD[0:7]) of the second board 200 with the status information (ICD[0:7]) of the first board 100 (step S28).

The apparatus and method for exchanging status information between boards of the present invention has many advantages. For example, where the status information is implemented in 8 bit words, the amount of transmittable status information is $8 \times 2^n$, where n is the number of address pins. Not only can more status information can be exchanged with fewer edge pins, but the duplication function between boards can be more effectively implemented.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structure equivalents but also equivalent structures.

What is claimed is:

1. An apparatus for exchanging information between circuits, comprising:

first and second circuits having a same construction and configured to exchange first and second information based on respective address signals, each of the circuits further configured to latch the information received from the other circuit through a respective clock signal; and a connecting unit configured to couple the first and second circuits to enable transmission and reception of the first and second information to take place between the first and second circuits, wherein the connecting unit includes a number of edge pins for carrying the first and second information between the first and second circuits and wherein the number of edge pins is less than a total number of bits in each of the first and second information.

2. The apparatus of claim 1, wherein the first and second circuits comprise first and second circuit board assemblies, respectively.

3. The apparatus of claim 1, wherein the first and second information comprises status information of the first and second circuits, respectively.

4. The apparatus of claim 3, where the status information is indicative of at least one of an active status and a standby status.

5. The apparatus of claim 1, wherein the first circuit is configured to assign a larger number of address connection points in the connecting unit as an amount of the first information is increased.

6. The apparatus of claim 5, wherein at least $2^n$ bits of the first information are enabled by n address connection points.

7. The apparatus of claim 6, wherein $8 \times 2^n$ bits of the first information are enabled where the first information is implemented in 8 bit words.

8. The apparatus of claim 7, wherein a total number of connection points is given by n+8+1, where 8 connection points are used for the first information, and 1 connection point is used for a clock signal.

9. An apparatus for exchanging information between circuits, comprising:

first and second circuits having a same construction and configured to exchange first and second information based on respective address signals, each of the circuits configured to latch the information received from the other circuit through a respective clock signal; and a connecting unit configured to couple the first and second circuits to enable a transmission and reception of the first and second information to take place between the first and second circuit;

a first signal generator configured to assign address connection points and a clock connection point according to the information of the first circuit and further configured to generate a first address signal and a first clock signal;

a first information transmitting unit configured to buffer the first address signal, the first clock signal and the information of the first circuit corresponding to the first address signal for transmission to the second circuit;

a first information receiving unit configured to receive information of the second circuit, the second address signal and a second clock signal; and a first array configured to output the first information, and further configured to compare the second information to the first information.

10. The apparatus of claim 9, wherein the first signal generator periodically generates the first address signal at prescribed intervals and outputs the first address signal.

11. The apparatus of claim 9, wherein the first signal generator outputs the first clock signal at a time that allows one of the first and second circuit to latch the information of the other circuit.

12. The apparatus of claim 9, wherein the first information transmitting unit and the first information receiving unit each comprises a buffer configured to buffer a signal outputted from the first circuit and a signal received from the second circuit, respectively.

13. The apparatus of claim 9, wherein the second circuit comprises a second information transmitting unit configured to the information of the second circuit, a second address signal and a second clock signal and a second information receiving unit configured to receive the information of the first board, the first address signal and the first clock signal.

14. The apparatus of claim 9, wherein the first array includes a plurality of registers configured to store and output the information of the first and second circuit according to the first and second address signal and the first and second clock signal, respectively.

15. The apparatus of claim 14, wherein the plurality of registers is divided into a first group configured to receive the information of the first circuit and a second group configured to receive the information of the second circuit.

16. The apparatus of claim 14, wherein each of the plurality of registers is enabled by one of the first and the second address signals.

17. The apparatus of claim 9, wherein the first array is configured to output the first information corresponding to the first address signal.

18. The apparatus of claim 9, wherein the first array is configured to latch the second information using the second clock signal.

19. The apparatus of claim 9, wherein the first signal generator is configured to assign a larger number of address connection points as the amount of first information is increased.

20. A method for exchanging status information between circuits comprising:

transmitting first status information of a first circuit to a second circuit, wherein the first status information corresponds to a first address signal;

receiving second status information corresponding to a second address signal from the second circuit in a first array;

comparing the first and second status information to determine at least one of a third status information of the first circuit and a fourth status information of the second circuit; and wherein each of the first, second, third, and fourth status information comprises at least one of active and standby status.

21. The method of claim 20, wherein the first and second circuit comprise first and second circuit card board assemblies, respectively.

22. The method of claim 20, further comprising transmitting a first clock signal so that the first status information can be latched in the second circuit.

23. A method for exchanging information between circuits, comprising:

transmitting first status information of a first circuit to a second circuit, wherein the first status information corresponds to a first address signal;

receiving second status information corresponding to a second address signal from the second circuit in a first array; and comparing the first and second status information to determine at least one of a third status information of the first circuit and a fourth status information of the second circuit, wherein transmitting the first status information comprises:
generating the first address signal at prescribed intervals;
associating the first information to the generated first address signal; and
generating a first clock signal timed so that the first information can be latched in the second circuit.

24. The method of claim 23, wherein the first clock signal is generated to be high when first information is received at the second circuit.

25. The method of claim 20, wherein receiving the second status information comprises:
buffering the second address signal, the second information and a second clock signal; and
receiving the buffered second address signal, the buffered second information and the buffered second clock signal in the first array.

26. A method for exchanging status information between first and second boards, comprising:
receiving a status information from the first board;
assigning periodically an address signal and a clock signal to the status information;
transmitting the assigned status information to the second board through a plurality of edge pins, and wherein the status information is timed to the clock signal so that the status information can be latched by the second board.

27. The method of claim 26, wherein the first board and the second board have same construction.

28. The method of claim 26, wherein the edge pins include data pins, clock pins and address pins.

29. The method of claim 26, wherein the number of edge pins for transmitting the status information is determined by a number of bit of the status information, a number of bits of the address signal and a number of bits of the clock signal.

30. The method of claim 26, further comprising:
receiving a status information from the second board; and
comparing the first board's status information and the second board's status information to determine an operational status of at least one of the boards.

31. The method of claim 30, wherein the operational status is one of an active state and a standby state.

32. A method for exchanging status information between first and second boards, comprising:
generating periodically an address signal at prescribed intervals;
generating a clock signal;
assigning consecutively the status information of the first board to the generated address signal; and
timing the assigned status information to the generated clock signal and transmitting the timed status information to the second board through a plurality of edge pins.

33. The method of claim 32, wherein the first board and the second board have same construction.

34. The method of claim 32, wherein the plurality of edge pins include data pins, clock pins and address pins.

35. The method of claim 32, wherein the status information is timed to the clock signal so that the state information can be latched by the second board.

36. The method of claim 32, wherein the number of the edge pins for transmitting the state information is determined by a number of bits of the status information, a number of bits of the address signal and a number of bits of the clock signal.

37. The method of claim 32, further comprising:
receiving a status information from a second board; and
comparing the first board's status information and the second board's status information to determine an operational status of at least one of the boards.

38. The method of claim 35, wherein the operational status is one of an active state and a standby state.

* * * * *